United States Patent [19]

Montgomery et al.

[11] 4,333,737
[45] Jun. 8, 1982

[54] RECLAMATION OF MATERIALS FROM PHOTOFLASH CARTRIDGES

[75] Inventors: Francis E. Montgomery, Bloomfield; James E. Short, Jr., Switz City; William J. Weaver, Washington, all of Ind.

[73] Assignee: The United States of America as represented by the Secretary of the Navy, Washington, D.C.

[21] Appl. No.: 258,984

[22] Filed: Apr. 30, 1981

[51] Int. Cl.³ .................... B01D 9/02; B01D 11/02; B01F 1/00

[52] U.S. Cl. .................................. 23/297; 23/302R; 23/304; 149/109.6

[58] Field of Search .............. 23/297, 299, 302 R, 23/304; 427/345; 423/395, 475, 658.5; 149/42, 43, 109.6, 19.92

[56] References Cited

U.S. PATENT DOCUMENTS

| | | | |
|---|---|---|---|
| 1,706,938 | 3/1929 | Roberts | 149/109.6 |
| 2,489,573 | 11/1949 | Hampel | 423/475 |
| 3,451,789 | 6/1969 | McIntosh | 149/19.92 |
| 3,930,844 | 1/1976 | Parrish et al. | 423/395 |
| 3,982,930 | 9/1976 | Doades et al. | 423/395 |
| 4,057,442 | 11/1977 | Shaw et al. | 149/42 |
| 4,098,627 | 7/1978 | Tompa et al. | 149/19.92 |
| 4,229,182 | 10/1980 | Shaw | 23/239 |

FOREIGN PATENT DOCUMENTS 757442 3/1971 France ....................... 149/109.6

OTHER PUBLICATIONS 3,897,237 07001975 Musselman et al. 71 1

Primary Examiner—Bradley Gerris

[57] ABSTRACT

A process is provided for reclaiming materials from photoflash cartridges which are comprised of aluminum, barium nitrate and potassium perchlorate. The photoflash composition is dumped into heated water to dissolve barium nitrate and potassium perchlorate and the solution is then filtered to remove aluminum. Then the solution is cooled to precipitate the barium nitrate and the potassium perchlorate and the precipitated salts are then removed by filtering.

3 Claims, 1 Drawing Figure

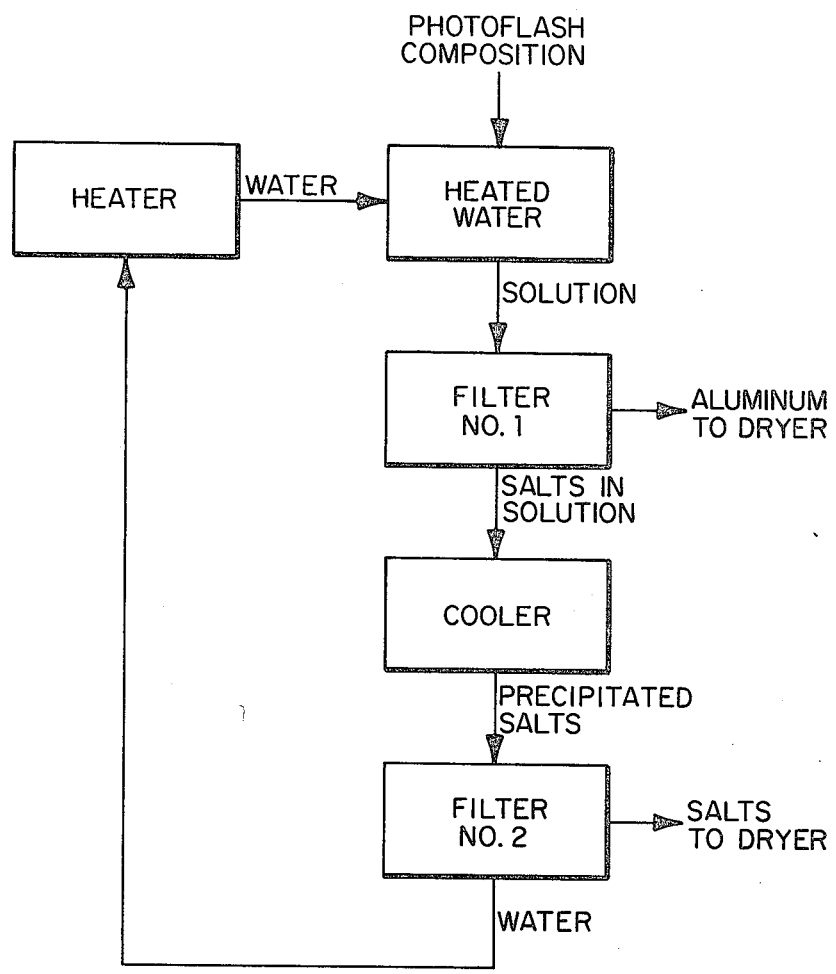

RECLAMATION OF MATERIALS FROM PHOTOFLASH CARTRIDGES

BACKGROUND OF THE INVENTION the present invention relates to a method of disposing of photoflash cartridges comprised of aluminum powder, potassium perchlorate and barium nitrate, and more particularly to a method of reclaiming materials from photoflash cartridges.

It is necessary to dispose of photoflash cartridges which are no longer usable due to age, damage or other conditions, as storage is both costly and hazardous.

heretofore, the main disposal method for photoflash cartridges and other pyrotechnic devices has been by burning in an open pit in a sparsely populated area. In some cases, disposal of unserviceable items was accomplished by dumping at sea. Both methods, however, are undesirable because of pollution to either the air or water.

SUMMARY OF THE INVENTION

The present invention relates to a method of disposing of photoflash cartridges and more particularly to a method of reclaiming the pyrotechnic materials present in photoflash cartridges.

A typical formulation of a photoflash cartridge used by the military is comprised of an unconsolidated mixture of about 40 percent atomized aluminum, about 30 percent barium nitrate and about 30 percent potassium perchlorate. The loose pyrotechnic composition is separated from the metal components of the cartridge and the pyrotechnic composition is dumped into heated water which dissolves the potassium perchlorate and barium nitrate. The heated solution is then filtered to remove the aluminum powder. The solution is then chilled and the potassium perchlorate and barium nitrate are precipitated and then removed by filtering. The aluminum powder and the precipitated salts are separately dried and are reusable in other pyrotechnic compositions.

It is therefore a general object of the present invention to provide a method of disposing of photoflash cartridges which is safe and non-polluting of the environment.

Another object of the present invention is to provide a method of reclaiming pyrotechnic materials from photoflash compositions.

Other objects, advantages and novel features of the present invention will become apparent from the following detailed description of the invention when considered in conjunction with the accompanying drawing.

BRIEF DESCRIPTION OF THE DRAWING

The FIGURE of the drawing is a block diagram showing the steps of a preferred method of the present invention.

DESCRIPTION OF THE PREFERRED EMBODIMENT

An automated, air-powered, explosion-proof machine is used to cut through the outer case of a photoflash cartridge so that photoflash composition can be removed. The photoflash composition is then dumped into process water heated to 130 degrees F. Distilled water is used for the initial process water and for any make-up water required. The agitated, heated process water dissolves the potassium perchlorate ($KClO_4$) and the barium nitrate ($Ba(NO_3)_2$), hereinafter referred to as "salt mixture", and leaves the aluminum powder in suspension. Then the heated solution is filtered to remove the aluminum powder which is then removed to a drying oven. The temperature of the heated water and the time that the composition remains in the water is critical due to the formation of ammonia ($NH_3$). It has been determined that the pH of the solution is temperature dependent, that is, raising the temperature of the solution will raise its pH. Also, a contact time of 15 minutes, or less, is desirable in order to minimize the formation and liberation of ammonia gas. Thus an operating temperature of about 130 degrees F. for a period of less than 15 minutes appears to be optimum, as temperatures lower than 130 degrees F. result in lowered solubilities of the potassium perchlorate and the barium nitrate. Actually, with agitation, the salt mixture will be completely dissolved in about one minute.

After the aluminum powder is filtered from the heated solution, the solution is chilled to 75 degrees F., or less, and this cooling precipitates the salt mixture which is then removed by filtering. The water is then recycled, heated and used again. The recovered salt mixture (potassium perchlorate and barium nitrate) is then dried in a vented, explosion-proof drying oven.

An analysis of the recovered salt mixtures disclosed that the potassium perchlorate recrystallized as a uniform rectangular-shaped crystal in the size range of 80-100 microns and the barium nitrate recrystallized as an irregular-shaped crystal in the range of 300 to 1000 microns. One way to reuse this mixture of potassium perchlorate and barium nitrate would be in future photoflash cartridge production. Also, the mixture could be used to make green flares.

It can thus be seen that the above-discussed method provides an environmentally acceptable method of disposing of photoflash cartridges. The reclaimed materials can be reused in the manufacture of pyrotechnic devices.

Obviously many modifications and variations of the present invention are possible in the light of the above teachings. It is therefore to be understood that the invention may be practiced otherwise than as specifically described.

We claim:

1. A process for reclaiming the chemical ingredients in photoflash cartridges comprised of aluminum powder, potassium perchlorate and barium nitrate, said process comprising, first dissolving said potassium perchlorate and said barium nitrate in water heated to about 130 degrees F., then filtering said aluminum powder from the heated water solution, then cooling said water solution to about 75 degrees F. to precipitate said potassium perchlorate and said barium nitrate, and then filtering said potassium perchlorate and said barium nitrate from the water.

2. A process for reclaiming the chemical ingredients in photoflash cartridges comprised of aluminum powder, potassium perchlorate and barium nitrate as set forth in claim 1 wherein said filtered aluminum powder is dried in a drying oven.

3. A process for reclaiming the chemical ingredients in photoflash cartridges comprised of aluminum powder, potassium perchlorate and barium nitrate as set forth in claim 1 where said filtered potassium perchlorate and said barium nitrate are dried in a drying oven.

* * * * *